(12) United States Patent
Willey

(10) Patent No.: US 6,234,554 B1
(45) Date of Patent: May 22, 2001

(54) BALL AND SOCKET WINDSHIELD MOUNTING

(76) Inventor: Barry A. Willey, 727 Ela Rd., Inverness, IL (US) 60067

( * ) Notice: Subject to any disclaimer, the term of this patent is extended or adjusted under 35 U.S.C. 154(b) by 0 days.

(21) Appl. No.: 09/571,248

(22) Filed: May 16, 2000

(51) Int. Cl.$^7$ .................................................. B62J 17/00
(52) U.S. Cl. ............................ 296/78.1; 248/288.31; 248/181.1; 403/133; 403/122
(58) Field of Search ............... 296/78.1; 248/288.31, 248/181.1, 481; 403/133, 122

(56) References Cited

U.S. PATENT DOCUMENTS

| | | | |
|---|---|---|---|
| 1,360,945 | * 11/1920 | Harley | 296/78.1 |
| 2,675,266 | * 4/1954 | Comiskey | 296/78.1 |
| 3,369,836 | * 2/1968 | Haycock et al. | 296/78.1 |
| 3,801,152 | * 4/1974 | Tims et al. | 296/78.1 |
| 3,891,265 | * 6/1975 | Blackburn | 296/78.1 |
| 3,904,238 | * 9/1975 | Anderson et al. | 296/78.1 |
| 4,082,345 | 4/1978 | Willey . | |
| 4,166,650 | * 9/1979 | Saunders | 296/78.1 |
| 4,168,098 | 9/1979 | Willey . | |
| 4,252,290 | 2/1981 | Willey . | |
| 4,269,445 | * 5/1981 | Gager | 296/78.1 |
| 4,320,906 | * 3/1982 | Saunders | 296/78.1 |
| 4,379,584 | 4/1983 | Willey . | |
| 4,439,886 | * 4/1984 | Yagasaki et al. | 296/78.1 |
| 4,440,436 | * 4/1984 | Giddens et al. | 296/78.1 |
| 4,489,973 | 12/1984 | Willey . | |
| 4,700,919 | * 10/1987 | Saunders | 248/481 |
| 4,952,006 | 8/1990 | Willey . | |
| 5,044,536 | * 9/1991 | Gleason | 296/78.1 |
| 5,732,965 | 3/1998 | Willey . | |
| 5,788,313 | 8/1998 | Willey . | |
| 5,845,955 | 12/1998 | Willey . | |

* cited by examiner

Primary Examiner—Joseph D. Pape
Assistant Examiner—Kiran B. Patel
(74) Attorney, Agent, or Firm—James T. FitzGibbon; Vedder, Price, Kaufman & Kammholz

(57) ABSTRACT

A windshield mounting system for a cycle comprising a plurality of rod members, a windshield, ball and socket units, a pair of windshield engaging flanges parallel to each other and spaced apart so as to accommodate the thickness of said windshield.

15 Claims, 2 Drawing Sheets

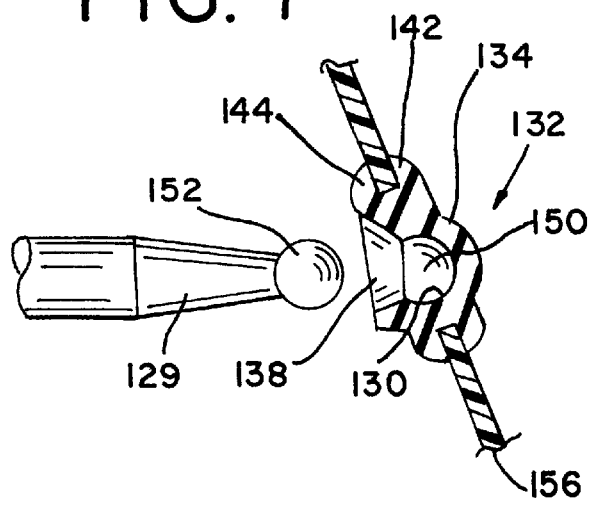
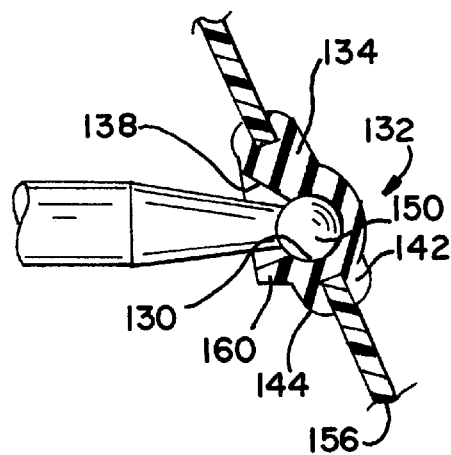
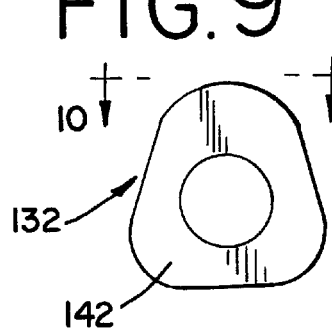
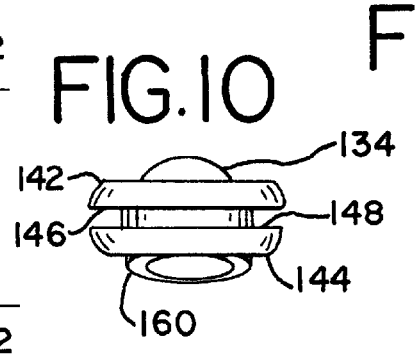
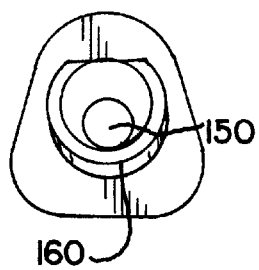
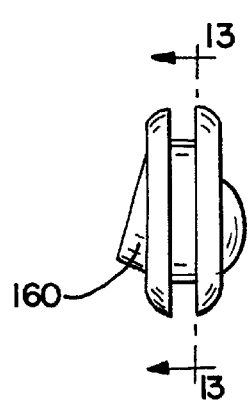
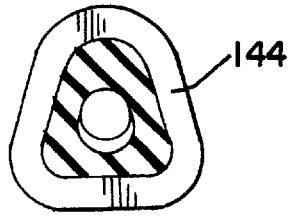

BALL AND SOCKET WINDSHIELD MOUNTING

BACKGROUND OF THE INVENTION

The present invention relates to mounting systems for windshields, more particularly for windshields on motorcycle, scooters, and the like.

A number of mounting systems have been developed for motorcycle windshields, and certain of these have achieved very widespread commercial success. For example, the systems described in U.S. Pat Nos. 4,379,584 and 4,489,973 have been very successful. The assignee of the present invention has pioneered this kind of glue-on attachment between the shield and the rod, and this application has a number of advantages and characteristics.

In addition, there are a number of mounting systems, somewhat less sophisticated, that use various fasteners extending through the windshield. These systems all use threaded rods or bolts, or other fasteners to hold them in place. However, these in turn require sleeves, grommets or other vibration-isolating parts between the rod and the shield. In some of these constructions, the rods are surrounded by rubber or plastic sleeves and extend through the windshields, and in other constructions, the rods terminate behind the windshield, and are secured in place by sleeve-isolated fasteners which in turn extend through the windshield.

However, there are a number of drawbacks to such systems. The first, from a manufacturing standpoint, is that of cost. Because of the need for fasteners, more parts than would be optimally indicated are used. In addition, where fasteners are required, this involves machining one end of the rod as well as creating an upset portion or the like for holding the shield in place. The rod may in one case be machined for axial insertion of a screw. This requires that two and perhaps more cooperating parts be machined so as to fit together.

In addition, and perhaps more important, is the question of reliability. With installations that require a washer or flange or a threaded rod with a grommet or sleeves, there is virtually always the question of reliable installation. Because these windshields are bought separately in many cases and installed on the cycle, the ability to install them precisely has always created a question. If the bolts are too tight, the grommet or sleeve is essentially over-tightened and excess strain is placed on the windshield. If the installation is too loose, there is a possibility of vibration and further loosening or even failure in use.

Accordingly, it would be a considerable advantage if there were an installation system which was extremely low in cost and which would be completely reliable in use. That is, that there would only be one correct position of installation, and that this would be the position to which the parts would naturally move. With such an installation, there would be no doubt about the proper manner of installing the same, or the degree to which it was installed. This is because the assembly would be made in two simple steps, both of which would be foolproof.

Another advantage would be to provide a shield that would have some slight freedom of adjustment without affecting its reliability of installation. This would enable the shield to be adjusted slightly once emplaced.

In view of the foregoing background, it is an object of the present invention to provide a low cost, highly reliable shield installation and method.

Another object of the present invention is to provide a mounting system that would require only drilling or machining a pair of mounting holes in the shield or fairing for installation of a particularly shaped, novel ball socket unit.

Yet another object of the present invention is, in one embodiment, to form a combination ball socket, vibration absorber and rod mounting system for a windshield.

Still another object of the present invention is to provide a shield which could be mounted with any number of different style rods, whether or not cylindrical throughout their entire extent, and having a variety of bends or curves.

A further object of the present invention is to create a ball socket having a cavity centralized within the mounting body so that the hollow cavity would allow the elastomeric socket body to collapse readily for purposes of installation.

A still further object of the present invention is to provide a mounting system which, once the ball on the end of the rod is inserted into the ball-mounting socket, would become a virtually solid unit.

An additional object of the present invention is to provide a mounting system which would allow for slight adjustments to be made to the handlebar without destroying the stability of the installation.

Another object of the present invention is to provide a mounting system with a predetermined pull-out force, so that, in the event of an accident, the shield could be freed from its mounting.

Yet another object of the present invention would be to make the pull-out force variable and adjustable merely by resizing the ball diameter, or making the socket from rubber of a different hardness or durometer.

Still another object of the present invention is to have a device against which the force exerted during the ball-end pull out could be arranged so as to be satisfactory throughout a ranges of different temperatures.

A further object of the present invention is to provide a ball socket which is surrounded, in the central part of the body, by a form of ball socket cutout or cavity which allows only for placing the rod in the socket at a particular angle, and in which the socket includes a pair of relatively flat shield-engaging flanges adapted to lie on either side of the windshield to secure the grommet in place.

An additional object of the present invention is to provide various non-circular types of mounting, whereby a cutout of a modified triangular or other shape would be milled into the windshield to receive the corresponding shape of an exterior of the ball socket body.

These and other objects of the present invention are achieved in practice by providing a rod having an end with a ball, preferably machined, on the end thereof and inserted in a socket unit having a major part of its internal surface spherical and the remainder forming an entrance for the rod end, the socket body being surrounded by a pair of flanges each extending radially outwardly on either side of the windshield from a generally spherical portion of the socket body.

The manner in which these and other objects and advantages of the present invention are achieved in practice will become more clearly apparent when reference is made to the following detailed description of the preferred embodiments of the invention set forth by way of example and shown in the accompanying drawings wherein like reference numbers indicate corresponding parts throughout.

BRIEF DESCRIPTION OF THE DRAWINGS

FIG. 7 is a fragmentary sectional view of another form of ball socket unit of the invention, showing the rod and ball in an exploded relation;

FIG. 8 is a sectional view similar to FIG. 7 showing the rod and its ball end in place within the socket;

FIG. 9 is a view from the front of the windshield of the ball socket arrangement of the embodiment of FIGS. 7–13;

FIG. 10 is a side elevational view of one form of the socket of FIGS. 7–13;

FIG. 11 is a view from the rear of the windshield of the socket of FIGS. 7–13;

FIG. 12 is an elevational view taken along lines 12—12 of FIG. 9; and

FIG. 13 is a sectional view, taken along lines 13—13 of FIG. 12.

DESCRIPTION OF THE PREFERRED EMBODIMENTS OF THE INVENTION

Although a number of different mounting systems may be proposed and used, and although the shield may be used with various forms of motorcycles, scooters, ATVs, or the like, a description of several preferred embodiments will be given wherein the vehicle on which it is mounted is a cycle or a scooter and in which the rods are affixed to the motorcycle handlebars by various forms of clamps.

Figure 1:
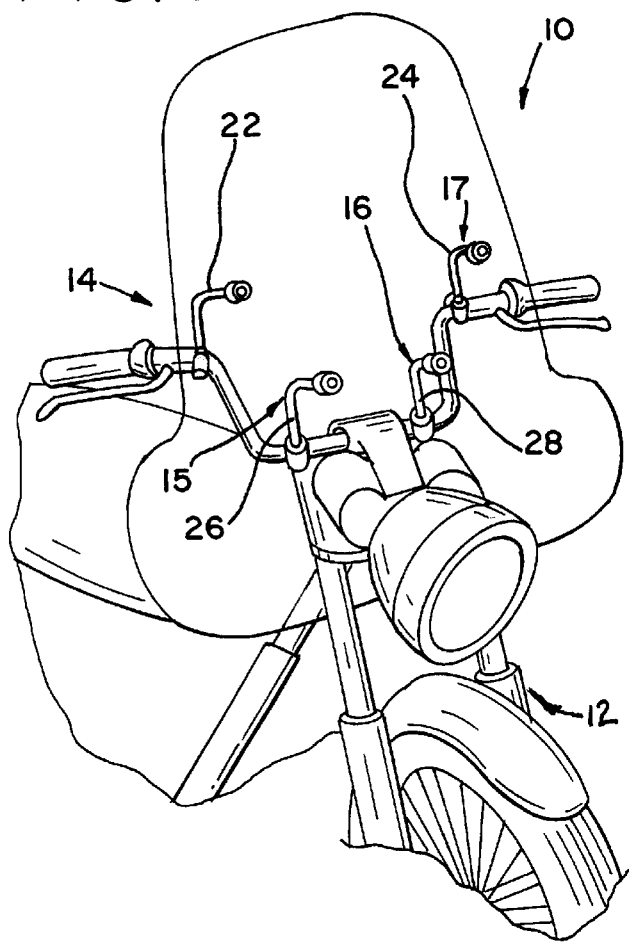
FIG. 1 is a perspective view of the cycle windshield of the invention, showing the same mounted by the inventive ball and socket mechanism in relation to the cycle.
Figure 2:
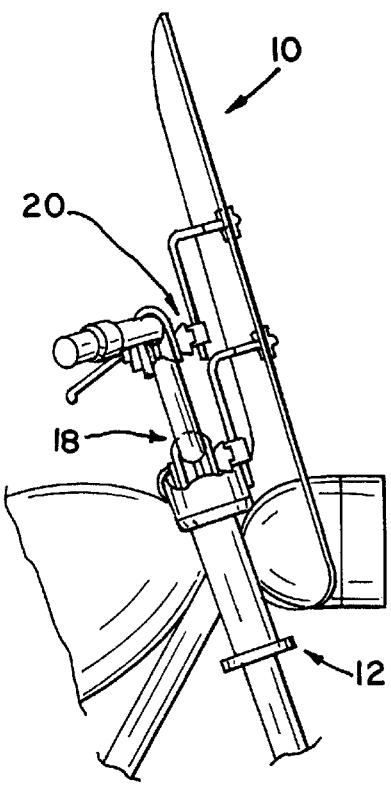
FIG. 2 is a side elevated view of windshield and mounting system of FIG. 1.
Figure 4:
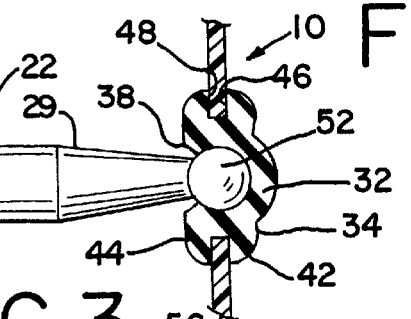
FIG. 4 is a fragmentary view showing the rod installed in the form of apparatus shown in FIG. 3.
Figure 3:
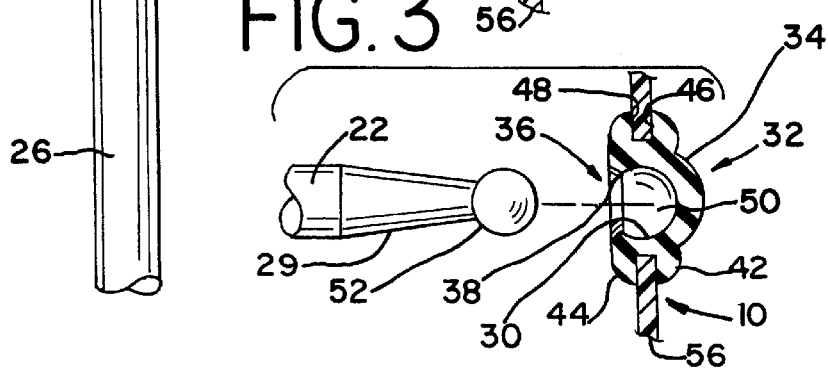
FIG. 3 is an exploded fragmentary view, showing the ball socket unit of the invention installed in place in a windshield and showing the position of a rod with a ball end before installation.
Figure 5:
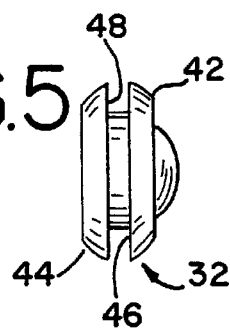
FIG. 5 is a side elevational view of the ball socket fitting of the invention.
Figure 6:
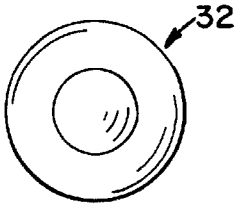
FIG. 6 is a view of the ball socket of the invention, taken from the front of the windshield.

Referring now to the drawings in greater detail, FIGS. 1 and 2 show a windshield generally designated 10 held in place in relation to a motorcycle or scooter generally designated 12 and arranged with two pairs of mounting rods generally designated 14, 15, 16, 17 which are arranged on the vehicle as shown generally in FIGS. 1 and 2. Generally, the lower pair of rods 15, 16 are secured as by a pair of clamps generally designated 18 secured to the handlebars and the upper pair of rods 14, 17 are also secured by pairs of clamps generally designated 20 which also attach to the handlebars. The rods have upper portions 22, 24 which are bent so as to lie generally perpendicular to the surface of the shield 10. The lower rod portions 26, 28 are arranged in most cases so as to extend more or less perpendicular to the ground, although considerable latitude is allowed. A tapered portion of the rod 29 preferably lies between the cylindrical portion 22 and the ball end 52 of the rod.

Referring now generally to FIGS. 3–6, the construction and arrangement of one of the ball socket units generally designated 32 is shown. Whereas there would normally be four ball sockets and associated rod ends for each windshield, the construction and arrangement of each of them is similar or identical to the others, and hence only one socket unit 32 will be described in detail.

The ball socket generally designated 32 includes a generally spherical main body portion 34, and further includes generally primarily spherical inwardly facing surfaces 30 defining an interior region 50, a ball-receiving entry opening generally designated 36, and beveled reentrant surfaces 38 surrounding the small part of the opening.

Each spherical body 34 also includes a windshield-engaging front flange 42 which is circumferentially continuous and extends radially outwardly, encircling the main body portion 34 above its equator, and a similar rear windshield flange 44 lying just below the equator of the body 34. Each of these parallel flanges terminates in axially inwardly directed mounting surfaces 46, 48 which surround and preferably tightly engage the portions of the windshield 56 lying immediately between them. The opening or axial space between Raflanges 42, 44, in a relaxed condition, is desirably just less than the thickness of the shield 56 for a snug fit.

The rod opening or entrance 36 is adapted to receive the ball end, generally designated 52, of one of the rods 14. The beveled surfaces 38 are on the socket 32 conical to allow slight movement of the rod end in all directions for adjustability once it is in position of use.

The assembly of the apparatus 10 may be accomplished in several ways, however, the preferred method is described herein. Holes are drilled, using a drill for the round holes, or a router for the holes of other patterns, and the openings of a suitable size are formed in the shield. For example, in the case of the fittings just described, a circular opening of 0.590 inches is drilled in the shield. Thereafter, the form of ball socket 32 shown in the drawings is emplaced, with the hollow opening 50 in the center permitting the unit 32 to be deformed sufficiently to be installed and therefore so that the flanges engage the surrounding portions of the shield.

After all four openings in the shield are filled with the ball sockets 32 of the invention, the ball ends 52 of the rods 14, 15, etc. are ready to be emplaced in the ball sockets. The sockets are supported on their ends opposite the opening 36, and the ball end 52 of the rod 14 is forcibly pressed into the ball socket from the opposite side of the ball-socket unit. A greater or less force is required, but once the unit is positioned within the opening 50, it achieves its unique installed position, that is, the ball, once inserted, comes to rest at only one position. Preferably, the ball sockets are placed in the shield at the factory, and inserting the rod ends is done by the customer, although both steps may be done at the factory.

The placement of the ball also exerts a substantial radial force on the main spherical body 34, compressing its outer edges more tightly within the opening 50, and allowing the flanges 42, 44 to grip the shield portion 56. Once in place, the ball tends to remain there and resists movement in any direction. Thereafter, the rods 14, 15, 16, 17 may be slightly adjusted and clamped with suitable clamps 18. While this is the preferred assembly sequence, another sequence may be used satisfactorily.

The geometry of the ball socket is such that it resists being pulled from the rods and pushed through the windshield as a whole. However, slightly more force is generally required to push the rod and the socket all the way through the opening than is required to withdraw the rod from the open side of the socket. If opening or withdrawing forces are critical, they can be adjusted by sizing the ball, or by varying the interference of the fit of the ball with the socket. These can be accomplished at different temperatures, also.

Referring now to FIGS. 7–11, another form of ball socket 132 having a modified triangular or other non-circular shape of the main body 134 is shown. This unit has an inwardly facing surface 130 defining a spherical interior region 150, and also includes windshield-engaging flanges 142, 144 surrounding the main body 134. Likewise, the surfaces 146 and 148 are present for positively engaging the opening in the windshield 156.

However, in this case, the opening in the shield is preferably formed a modified triangular shape with a router, and such an opening may be 0.590 inches across at the region 150 in one direction and 0.750 measured perpendicular to the 0.590 dimension. Hence, the flanges 142, 144 are longer in one dimension than in the other, and are preferably generally rounded, triangular or trapezoid sections. In addition, the beveled surfaces 138 defining the entrance to the spherical opening 150 are arranged so that an eccentric skirt portion 160 is provided. The skirt portion 160 extends generally from the flange 144 toward the wider end of the triangle or trapezoid, and the portion 129 of the rod having the ball 152 on the end enters the socket at an angle, say 25° from perpendicular to the windshield 156. The skirt, viewed in elevation, has the appearance set out in FIG. 12, and another view thereof is shown in FIG. 13, taken looking along lines 13—13 of FIG. 12. Accordingly, a 25° angle, plus or minus 15°, for example is typically provided for, but movement substantially beyond this dimension is prohibited by engagement between a tapered portion 29 of the internal section of the rod 22 and the resistance encountered by contact with the skirt 160 and also, to the beveled surface 138.

Referring now to the materials from which the windshield and the ball socket of the invention are made, the shield is preferably made from Lexan brand polycarbonate material, treated with a scratch resistant coating. In the alternative, the windshield may be made from a polymethyl methacrylate or modified acrylate composition. Other transparent plastics may also be used.

The ball socket unit is preferably made from a rubber material, most preferably a synthetic rubber having a durometer of about 55. The most preferred material at present is an ethylene-propylene dimer (EPDM), although other synthetic elastomers may be used. The ball socket units could be made from plastic or the like, also. The rods 14, 15, etc. are preferably made from a steel or other metal which is readily machined, and these are normally a one piece unit, although it is possible to machine a main portion having a ball 52 and the tapered stub 29 have this fitted to the end of the rod by an axial screw or like fastener.

The rods shown are merely for illustrative purposes. In one preferred configuration, two rods are supported by a single clamp. The angles shown could be varied within reason. Likewise, other support means for the rods could be provided. The rods could screw into fittings which in turn are fastened to the handlebars by other style clamps or otherwise.

An important feature of the ball and elastomeric socket arrangement are that it permits distortion sufficient to place it within the windshield while the ball is absent therefrom. The next step is to support the socket in place while the ball is being inserted. This may be done in any number of ways, but the simplest is merely to support the ball socket unit with a flat or contoured surface lying parallel to the shield which is held against movement while the ball is forcibly inserted into the space 50.

Referring to the shapes, as long as the flanges 42 or 44 engage the shield sufficiently so that the socket does not pop out readily, and are sufficiently large that they do not permit the socket unit to be removed from the windshield with a relatively small force, they are satisfactory. Provided that the flanges are not so large as to resist being distorted into the opening in the shield for assembly, the significance of an exact shape is not too great.

Likewise, the spherical shape 34 of the body of the socket is preferred but need not be exactly followed, since most portions of the flange on the body remote from the opening are not of significant consequence, except that they should have sufficient wall thickness to prevent being pierced by the ball. Regarding the modified triangular shape or shape somewhat resembling a trapezoid, this shape is formed therein in connection with the formation of a skirt, principally to prevent the rod and ball from moving excessively.

The plan view shown in FIG. 9 is preferred for this purpose, although the outline of the flange is not uniform, and the fact that it is somewhat wider or somewhat longer in cross section on one side than the other is likewise not too significant. Other shapes, such as a trapezoid or diamond shape may be used if desired. The use of the rubber compound specified is preferred and this has been found to allow the greatest latitude in retaining stiffness without becoming too stiff at low temperatures and too flexible at high temperatures. Likewise, this elastomer serves to absorb vibration well.

It will thus be seen that the present invention provides a new and improved windshield mounting apparatus and components thereof, having a number of advantages and characteristics including those expressly pointed out herein, and others which are inherent in the invention. An illustrative embodiment of the product of the invention having been shown and described, it is anticipated that variations to the described form of apparatus will occur to those skilled in the art and that such modifications and changes may be made without departing from the spirit of the invention, or the scope of the appended claims.

What is claimed is:

1. A windshield mounting system for a cycle, said mounting system comprising, in combination, a plurality of rod members each extending from a portion of the cycle with which they are associated in use toward a rear surface of the windshield, said windshield having front and rear surfaces and plural openings in said shield, for receiving ball socket units, said rod members including a reduced diameter portion and terminating in a spherical ball, a ball socket unit including a body with surfaces defining a hollow spherical opening of a given diameter disposed generally centrally therein, surfaces defining an entry portion of reduced diameter in relation to said given diameter, a pair of windshield engaging flanges surrounding said openings in said shield and extending radially outwardly from said body, one of said flanges being adapted to overlie the front surface of said shield and the other adapted to overlie the rear surface of said shield, said flanges being parallel to each other and spaced apart so as to accommodate the thickness of said windshield, said ball socket body being loaded in compression between said ball and said shield when said ball is forced into said spherical opening, said ball socket body and said spherical ball thereby resisting removal from said opening.

2. A windshield mounting system as defined in claim 1, wherein said ball socket units are made from rubber.

3. A windshield mounting system as defined in claim 1, wherein said ball socket units are made from a plastic material.

4. A windshield mounting system as defined in claim 1, wherein said ball socket units are made from an ethylene-propylene dimer (EPDM) synthetic rubber polymer.

5. A windshield mounting system as defined in claim 4, wherein said EPDM material has a durometer of about 55.

6. A windshield mounting system as defined in claim 1, wherein said body of said ball socket unit and said openings in said shield are circular.

7. A windshield mounting system as defined in claim 1, wherein said body of said ball socket and said openings in said shield have a modified triangular or modified trapezoid shape.

8. A windshield mounting system as defined in claim 1, wherein said parallel flange portions are spaced apart just less than the thickness of said windshield.

9. A windshield mounting system as defined in claim 1, wherein said plurality of rod members is four rod members.

10. A windshield mounting system as defined in claim 1, wherein said ball socket body further includes a skirt portion at least partially surrounding said opening for receiving said rod.

11. A windshield mounting system as defined in claim 1, wherein said rod members are cylindrical throughout their entire extent.

12. A windshield mounting system for a cycle, said mounting system comprising, in combination, cycle handlebars, rod members secured to said handlebars, each rod member extending from adjacent said handlebars toward said windshield and terminating in spherical ball ends, and a windshield secured to said ball ends, said ball ends being received in ball socket units secured to said windshield, said ball socket units each including a ball socket body with a spherical opening therein for receiving said ball ends, and a pair of windshield engaging flanges for each ball socket unit, said windshield engaging flanges being spaced apart so as to engage said windshield, said spherical opening being disposed in central alignment with said shield.

13. A windshield mounting system as defined in claim 12, wherein said ball socket units are made from a stiff but resilient rubber material.

14. A windshield mounting system as defined in claim 13, wherein said stiff but resilient rubber material is an ethylene-propylene dimer based material.

15. A windshield mounting system as defined in claim 12, wherein said ball socket units are units of a round, modified triangular or modified trapezoid shape when viewed along the axis of said rod members.

* * * * *